March 22, 1955  F. J. EMERSON  2,704,565
ICE CLEAT ATTACHMENT FOR TIRE CHAIN
Filed March 10, 1952
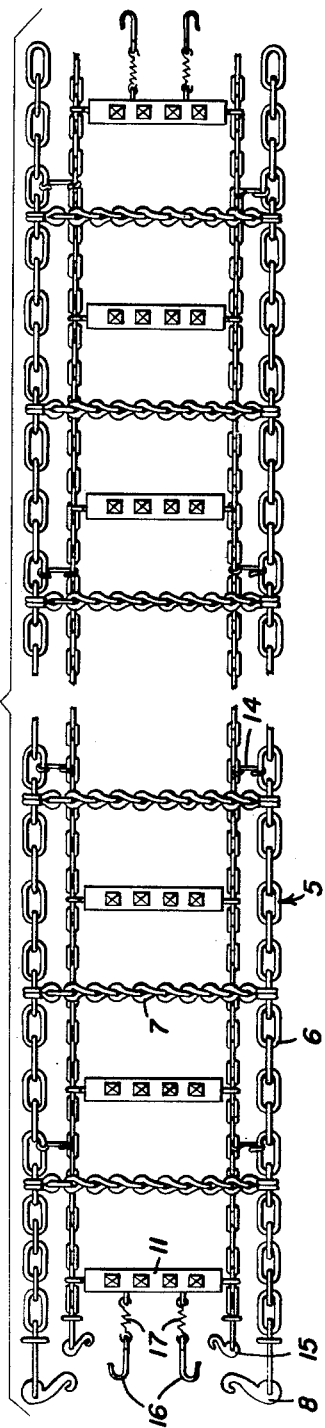
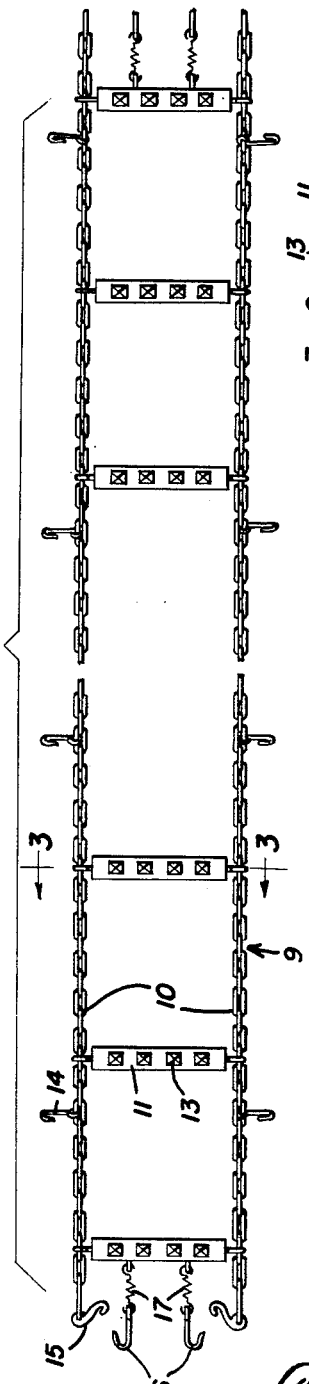
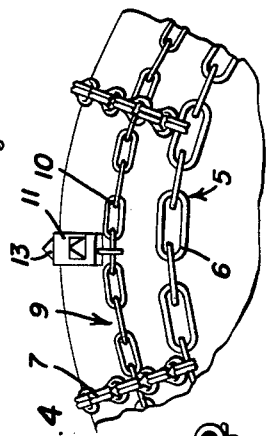
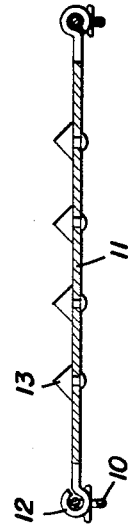
Frank J. Emerson
INVENTOR.

United States Patent Office 2,704,565
Patented Mar. 22, 1955

2,704,565
ICE CLEAT ATTACHMENT FOR TIRE CHAIN

Frank J. Emerson, Bearsville, N. Y.

Application March 10, 1952, Serial No. 275,731

4 Claims. (Cl. 152—239)

The present invention relates to new and useful improvements in tire chains and more particularly to an auxiliary chain for use with icy road conditions and adapted for easily and quickly attaching to a conventional type of tire chain.

An important object of the invention is to provide an auxiliary tire chain constructed of a pair of circumferential chain members equipped with means for attaching the same to the circumferential chain members of a conventional tire chain and providing the auxiliary chain with cross units having ice gripping cleats to more effectively prevent skidding of the vehicle on icy roads.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings, forming part hereof, wherein like numerals refer to like parts throughout, in which:

Figure 1 is a top plan view showing the auxiliary chain attached to a conventional tire chain;

Figure 2 is a similar view of the auxiliary chain removed from the tire chain;

Figure 3 is an enlarged transverse sectional view taken on the line 3—3 of Figure 2; and Figure 4 is a fragmentary perspective view of a tire showing the main and auxiliary chains thereon.

Referring now to the drawings in detail, wherein for the purpose of illustration I have disclosed a preferred embodiment of the invention, the numeral 5 designates a conventional type of tire chain and which includes a pair of circumferential chain members 6 adapted for positioning at the opposite sides of a vehicle tire and cross chain units 7 connected to the circumferential chain members. The tire chain 5 is secured in position on a vehicle tire by means of the fasteners 8 of a conventional type.

The present invention comprises an auxiliary tire chain unit designated generally at 9 and which also comprises a pair of circumferential chain members 10 and cross units 11 preferably constructed of bendable strap metal and having hooks 12 welded to the ends of the cross units 11 to engage the links of the circumferential chain members 10, the hooks being substantially closed about the links. A plurality of cleats 13 are riveted to the cross units 11.

Each of the circumferential chain members 10 are provided with a plurality of snap hooks 14 adapted for quickly connecting the same to the circumferential chain members 6 of the tire chain 5, the circumferential chain members 10 extending parallel to and positioned between the circumferential chain members 6 and with the cross chains 7 overlying the circumferential chain members 10 of the auxiliary tire chain.

The ends of the circumferential chain members 10 are also provided with conventional chain fasteners 15 to secure the auxiliary tire chain in position on the vehicle tire.

The tire chain 5 may be used on the tire either with or without the auxiliary tire chain 9, the latter being attached to the regular tire chain 5 when road conditions are such that the regular chain is inadequate and the cleats 13 needed to effectively grip an icy road surface to prevent skidding.

The endmost cross units 11 may also be provided with hooks 16 connected to the cross units by coil springs 17 and adapted for connecting the hooks in end to end relation to each other.

In view of the foregoing description taken in conjunction with the accompanying drawings, it is believed that a clear understanding of the invention will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A tire chain comprising a first pair of circumferential chains adapted for mounting on the tread of a tire, cross bars connected to the first pair of chains, a second pair of circumferential chains adapted to be positioned at the inner and outer sides respectively of the tire, and outwardly of the first pair of chains, and quick detachable fastening means connecting the first pair of chains to the second pair of chains.

2. A tire chain comprising a first pair of circumferential chains adapted for mounting on the tread of a tire, cross bars connected to the first pair of chains, a second pair of circumferential chains adapted to be positioned at the inner and outer sides respectively of the tire and outwardly of the first pair of chains, cross chains connecting the second pair of chains to each other, and quick detachable fastening means connecting the first pair of chains to the second pair of chains.

3. A tire chain comprising a first pair of circumferential chains adapted for mounting on the tread of a tire, cross bars connected to the first pair of chains, a second pair of circumferential chains adapted to be positioned at the inner and outer sides respectively of the tire, and outwardly of the first pair of chains, cross chains connecting the second pair of chains to each other and positioned parallel to said cross bars and overlying the first pair of chains, and means connecting the adjacent circumferential chains of one pair to the other pair.

4. An anti-skid device comprising a pair of tire chain units adapted for independently mounting on a tire, each of said units including a pair of circumferential chains and cross members connecting the pair of circumferential chains of the respective units to each other, said circumferential chains being adapted to be disposed parallel to each other and being secured to each other at opposite sides of the tire, and fastening means detachably connecting the circumferential chains of one unit to an adjacent circumferential chain of the other unit.

References Cited in the file of this patent

UNITED STATES PATENTS

| | | |
|---|---|---|
| 768,495 | Weed | Aug. 23, 1904 |
| 896,728 | Hoff | Aug. 25, 1908 |
| 1,315,866 | Schwartz | Sept. 9, 1919 |
| 1,441,113 | Pepper | Jan. 2, 1923 |
| 1,458,107 | Sincell | June 5, 1923 |
| 1,467,927 | Doerres et al. | Sept. 11, 1923 |
| 1,502,792 | McGee | July 29, 1924 |
| 1,548,113 | Bridge | Aug. 4, 1925 |
| 1,740,092 | Hodell | Dec. 17, 1929 |
| 1,890,346 | Tudhope | Dec. 6, 1932 |
| 2,178,041 | Hodell | Oct. 31, 1939 |